United States Patent Office 2,936,627
Patented May 17, 1960

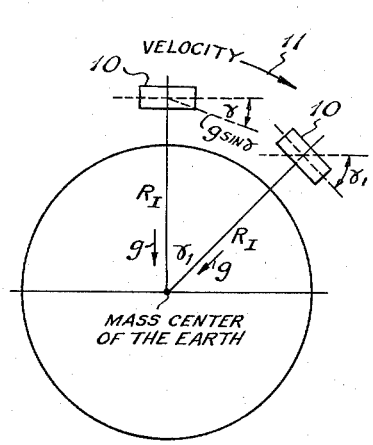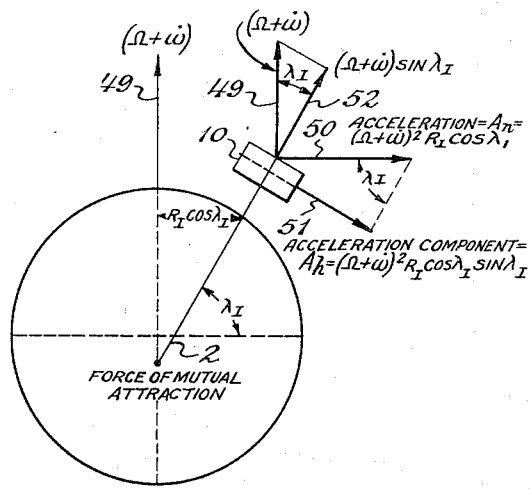
Fig. 2.   Fig. 3.
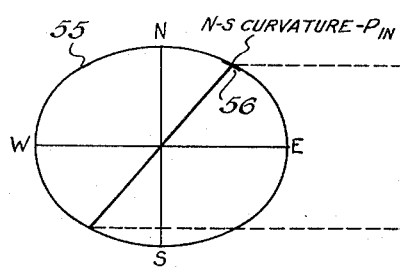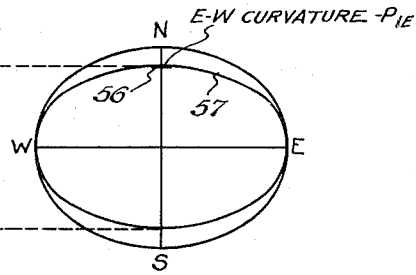
Fig. 4.

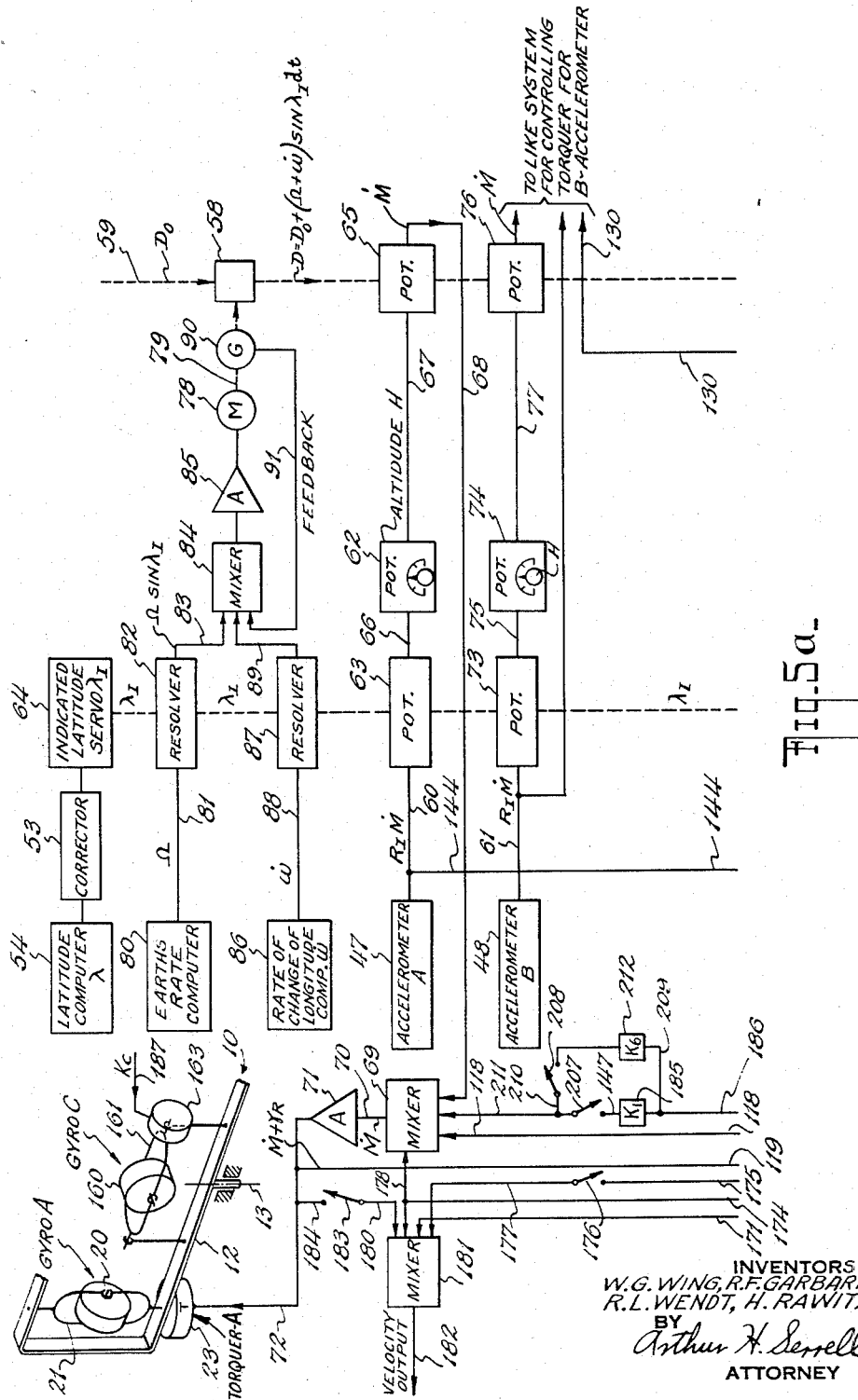

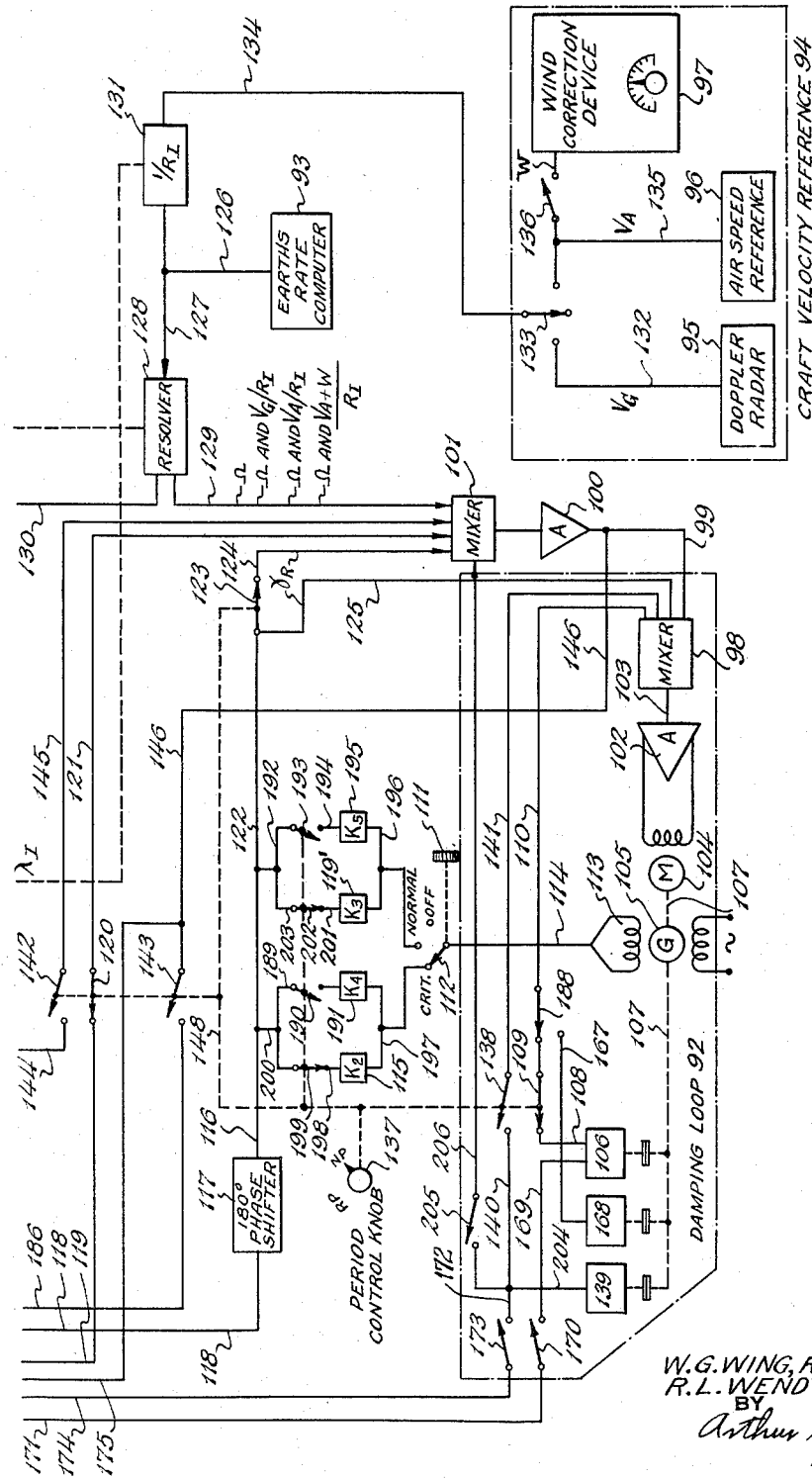

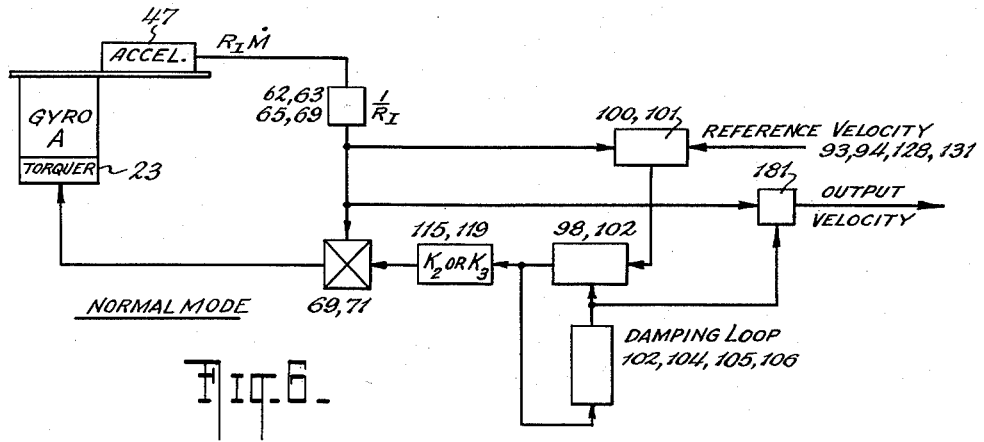
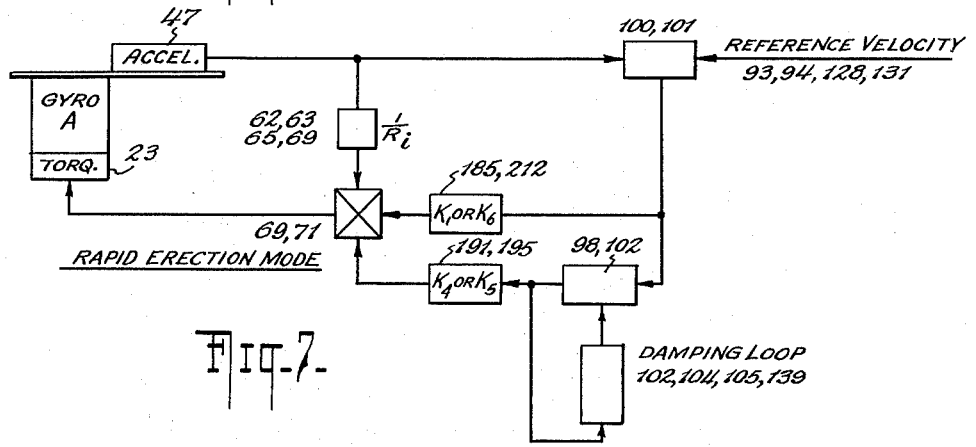
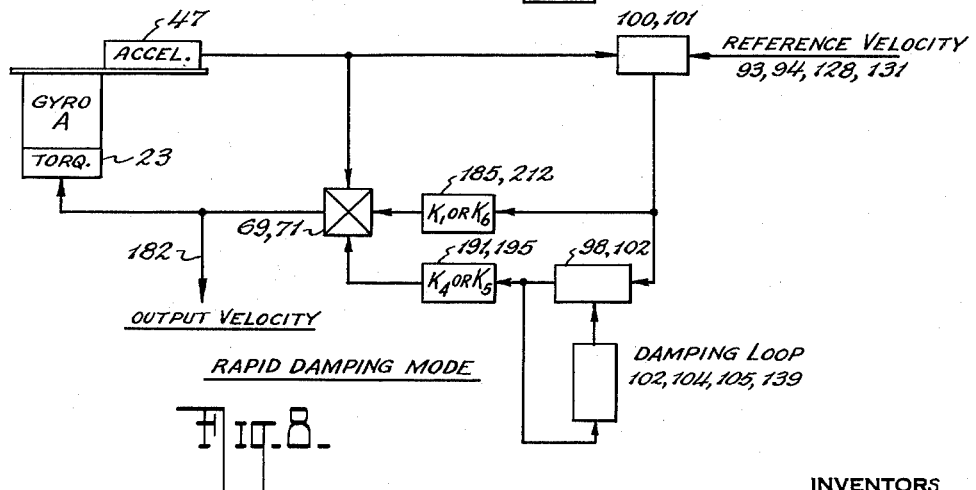

2,936,627

VERTICAL AND VELOCITY REFERENCE DEFINING SYSTEM

Willis G. Wing, Roslyn Heights, Robert F. Garbarini, Woodside, Robert L. Wendt, Woodbury, and Herbert Rawitz, Wantagh, N.Y., assignors to Sperry Rand Corporation, a corporation of Delaware Application January 3, 1956, Serial No. 557,152

35 Claims. (Cl. 74—5.34)

The present invention relates to a vertical reference defining system of the Schuler tuned gyroscopic type which provides an extremely accurate reference for use in a dirigible craft. The system also provides an accurate velocity reference for the craft on which it is used.

In accordance with the present inventive concepts, the improved system includes a platform having gyroscopic stabilization with a follow-up arrangement that operates through a torque motor for the gyroscopes to precess the platform about its defining reference axes at a rate that corresponds with and is opposite to the rate that the platform would turn about the noted vertical due to craft change in position as affected by the influence on the system of both the rotation of the earth and the angular velocity of the craft. The effect on the platform of the total angular velocity of the craft and earth is continuously balanced in the operation of the system so that the vertical axis reference established by the gyroscopic component is accurately maintained.

The vertical provided and maintained by the stable platform of the improved system lies between a geocentric and a geographic vertical. The geocentric vertical may be defined as the vertical determined by a line passing through the observer and the geometric center of the earth. Such a vertical would be normal to the surface of a spherical earth. The geographic vertical is the vertical determined by a line approximately normal to the oblate spheroidal surface of the earth. This vertical lies along the earth's total gravitational force field and therefore corresponds to the direction of a plumb bob. The vertical defined by the platform of the improved system is herein defined as the indicated vertical to distinguish the same from both geocentric and geographic type verticals. One of the objects of the present invention is to provide a gyro stabilized platform that is erected to an indicated vertical as hereinafter described. The indicated vertical is herein defined as the attraction of the effective mass center of the earth. This is essentially the plumb bob vector minus the centrifugal force vector of the earth at a specific point.

Schuler tuning for the gyroscopic component necessitates that the reference system function with a normally undamped period of approximately 84.4 minutes. Because of this limitation, systems of this character although critically damped without effectively changing the period may require as long as eleven hours of operation after starting before arriving at an accurate determination of the vertical. A further object of the invention is to overcome this condition by providing a system of the character described whose period can be lowered below the normal noted period to enable the platform to be rapidly erected to an accurate level condition. The improved system includes means for lowering its period of operation below the period of approximately 84.4 minutes. In accordance with the invention, the period change over can be effective to start the reference system either when the craft is at rest or in motion.

A feature of the invention is to provide a reference system of the character described in which the damping signal is applied as an input to motors that torque the gyroscopes carried by the platform.

A further feature of the invention is the attainment of accurate velocity data from the improved system.

Another feature of the invention is the provision of a gyroscopic platform that when utilized in a craft flying at an essentially constant altitude is unaffected by centrifugal and Coriolis acceleration errors.

Still a further feature of the invention is the attainment of a reference system in which earth's rate is automatically supplied from accelerometers when damping is cut off.

Another feature of the invention is the provision of a system of this character with several different damping modes which can be switched without effecting the basis of the Schuler tuning thereof.

Other objects and features of the invention will be apparent from the following description when read in relation to the accompanying drawings wherein:

Fig. 2 is a diagram utilized in explaining the principle of a Schuler-tuned reference system;

Figs. 3 and 4 are views representing a cross section of the earth utilized in explaining the indicated vertical provided by the reference system;

Figure 1:
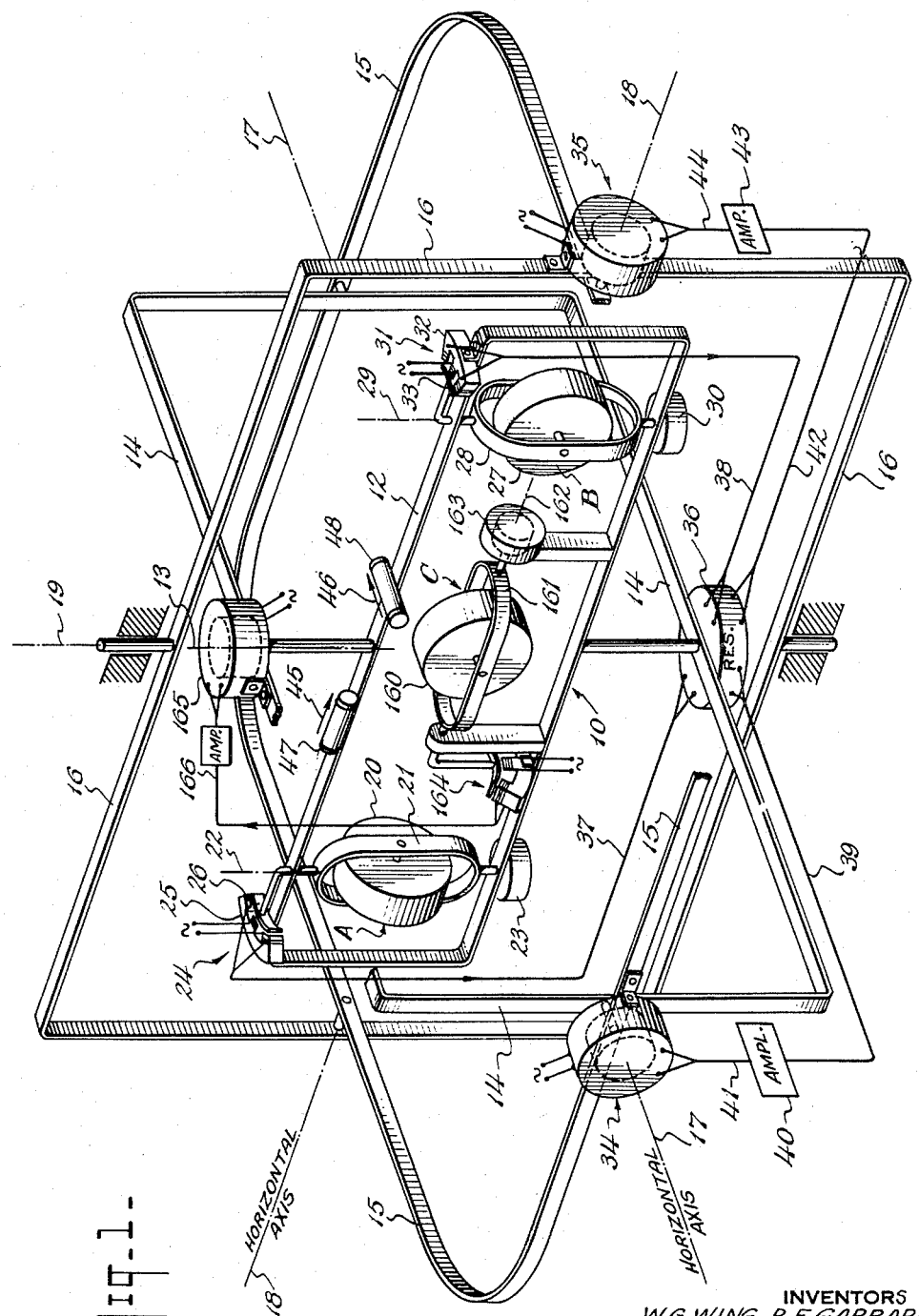
Fig. 1 is a perspective view showing the gyroscopic portion of the improved vertical reference system.

Figs. 5($a$) and 5($b$) present a schematic view and wiring diagram showing the component elements and interconnections of a preferred embodiment of the complete system as far as two of the gyroscopes are concerned. The like control system for the gyroscope B shown in Fig. 1 has not been illustrated in order to avoid undesired duplication in both the drawing and specification;

Fig. 6 is a diagrammatic view of the system with the essential elements thereof conditioned for operation in the normal mode;

Fig. 7 is a diagrammatic view of the system with the essential elements thereof conditioned for operation in the rapid erection mode; and Fig. 8 is a diagrammatic view of the system with the essential elements thereof conditioned for operation in the rapid damping mode.

The vertical reference system constructed in accordance with the present inventive concepts utilizes the principle of the Schuler tuned pendulum which has an undamped period of approximately 84.4 minutes. To understand this principle as it is applied to a gyroscopically stabilized platform 10 with a linear accelerometer thereon, it may first be assumed with reference to Fig. 2 that the craft is moving at a constant linear velocity V as indicated by arrow 11 over the surface of the earth. It is also assumed for this discussion that the earth is a non-rotating body. As shown in Fig. 2, the turning angle $\gamma_1$, of the platform as it moves with respect to the earth, is equal to the velocity V of the craft divided by the indicated radius of curvature $R_I$ of the earth. This forms the basis of Schuler tuning which satisfies the equation $V/R_I = -d\gamma_1/dt$. If the platform 10 is considered to tilt through an angle $\gamma$ with respect to a horizontal plane, an accelerometer senses a component of gravity ($g$) that is equal to $g \sin \gamma$. By instruments operating in accordance with the principle, the platform is returned to a vertical condition at an angular acceleration proportional to $g \sin \gamma/R_I$ where $R_I$ is the effective earth's radius. This is represented in the following equation $$\frac{d^2\gamma}{dt^2} = -\frac{g \sin \gamma}{R_I}$$

where $t$ is time.

The negative sign is used in the equation because the angular acceleration of the platform as it returns to a vertical condition is of the opposite sense from that of the assumed tilt angle. For small angles of tilt where the sine $\gamma$ approaches $\gamma$, the equation may be represented:

$$\frac{d^2\gamma}{dt^2}+\frac{g\gamma}{R_1}=0$$

This is a differential equation describing a simple harmonic motion where the period (T) is represented in the following equation:

$$T=2\pi\sqrt{R_1/g}\approx 84.4 \text{ minutes}$$

With respect to Fig. 1, the improved reference system illustrated includes a platform 10 that is represented by a vertical ring 12. The platform element or ring 12 of the system is carried in a gimbal mounting with freedom about a vertical axis 13 which defines the vertical reference axis established by the system. As shown, the mounting includes cooperating gimbals 14, 15 and 16. The gimbals 14 and 15 provide two mutually perpendicular, normally horizontal axes of support for the platform as respectively indicated at 17 and 18. Gimbal 16 of the mounting is shown as movable in relation to the craft about the azimuth axis thereof as indicated at 19. The upper and lower bearings shown in Fig. 1 receiving the corresponding trunnions of gimbal 16 are fixed to the craft or movable vehicle in which the system is incorporated. As represented in this figure, the azimuth axis 19 of the craft and the vertical axis 13 of the reference platform 10 are coincident. The attitude of the craft is consequently one of zero pitch and zero roll in relation to the vertical established by the system so that the craft is moving in a level condition in a horizontal plane. It will be understood that if the craft climbs, dives or banks the relation of the axes 13 and 19 is no longer as depicted in the drawing. Changes of the character noted in no way affect the vertical reference axis 13 established by the system. The platform 10 carried by the gimbal mounting described is movable about two mutually perpendicular, normally horizontal axes 17 and 18 and the vertical reference axis 13. The gimbal mounting for the platform is also movable in relation to the craft about the azimuth axis 19 through the vertical gimbal 16.

The gyroscopes of the improved vertical and velocity reference defining system are mounted on the platform 10. As shown, the gyroscopic stabilizing means includes a pair of gyros generally indicated in Fig. 1 at "A" and "B" and a third gyro indicated at "C." Gyro A includes a rotor element 20 that is driven by suitable means (not shown) to spin about a horizontal axis on a frame 21 supporting the rotor on the platform 10 with freedom about a precession axis 22. A torque motor situated at one end of the frame 21 has a stator 23 connected to the platform and a rotor connected to the frame 21. The torque motor designated as torquer A in Fig. 5(a) exerts a torque about the precession axis 22 of the gyro A.

At the other end of the frame 21 of gyro A is located a suitable pick-off that provides a signal measuring gyro displacement from a reference condition about the axis 22. As shown, the pick-off indicated at 24 is a signal transformer unit of the type shown in the U.S. Patent 1,959,804 to Wittkuhns et al. Pick-off 24 includes an E-type magnetic stator 25 that is fixedly mounted on the platform 10 to the upper portion of ring 12. The winding of the central leg of the stator 25 is energized from a suitable source of alternating current electrical energy. The series opposed secondary windings on the outside legs of the stator 25 provide an output signal of phase and magnitude denoting the direction and extent of angular displacement developed between the stator and a curved armature element 26 that is fixed to an extension of the frame 21. When the platform 10 is oriented in relation to gyro A so that the armature 26 of the pick-off 24 is centrally located in relation to the stator element 25, the pick-off provides a null output. In the operation of the system, the pick-off 24 detects departure from this oriented condition to provide a corrective output.

Gyro B of the system is identical to the described gyro A except that the rotor 27 is arranged to spin about an axis that is normal to that of the rotor 20 of gyro A. The frame for rotor 27 is indicated at 28, the precession axis of the frame 28 at 29, the stator of a torque motor fixed to the platform 10 at 30 and the pick-off at 31. As shown, the wound and energized E-type stator 32 of pick-off 31 is fixedly connected to the platform 10 and the armature 33 is located on an extension of the frame 28 of the gyro B. Like pick-off 24, the pick-off 31 detects departure from a condition of orientation between the platform 10 and the gyro B and provides a signal output whose phase and magnitude correspond to the direction and extent of the displacement of the parts about axis 29. Gyro C includes a rotor element 160 that is driven by suitable means (not shown) to spin about a horizontal axis on a frame 161 supporting the rotor on the platform 10 with freedom about a precession axis 162. The torque motor and pick-off elements for gyro C are respectively indicated at 163 and 164. By construction, the spin and precession axes of gyro C are parallel to the platform 10. In the gyroscopic arrangement shown in Fig. 1, the spin axis of the respective gyros A and B are mutually perpendicular and the precession axes 22 and 29 are parallel. The gyroscopes A and B provide stabilization of the platform with respect to the horizontal axes 17 and 18 of the gimbal mounting. Gyro C provides gyroscopic stabilization for the platform 10 about the reference axis 13.

The portion of the vertical reference system shown in Fig. 1, further includes suitable motive means for positioning the platform about its respective horizontal axes 17 and 18. As shown, a suitable motor 34 has a stator element fixed to the gimbal ring 15 and a rotor element connected to the gimbal ring 14 carrying the platform 10. A similar motor 35 with a stator fixed to ring 16 and rotor connected to gimbal 15 controls the platform about axis 18. Motors 34 and 35 operate to maintain the outputs of the respective pick-offs 24 and 31 of the system at a null condition. The control field windings of the respective motors 34, 35 may be energized as shown from the signals of the pick-offs 24 and 31 through a suitable resolver or variable coupling 36 which may be of the type shown in Fig. 2 of the U.S. Patent No. 2,591,697 to R. F. Hays, Jr. Leads 37 connect one of the windings of the rotor of the resolver 36 to the pick-off 24. Leads 38 connect the other of the windings of the rotor of the resolver 36 to pick-off 31. The rotor of the resolver is positioned by the vertical ring element 12 defining the stabilized platform of the system. The stator of the resolver 36 is fixed to the gimbal ring 14 and one of its windings is connected to the control field winding of motor 34 by way of leads 39, amplifier 40 and leads 41. The other of the stator windings of the resolver 36 is connected to the control field winding of motor 35 by way of leads 42, amplifier 43 and leads 44. The variable coupling 36 between the respective motors 34, 35 and pick-offs 24, 31 operates to apportion the signals of the pick-offs in accordance with the orientation of the platform in relation to its reference defining vertical axis 13 with respect to gimbal 14 of the gimbal mounting provided between the platform and the dirigible craft. The signal from pick-off 164 of gyro C measures the gyro displacement from a reference condition about its precession axis 162. Motor 165 on gimbal 14 is connected to the platform 10. The output of pick-off 164 fed to motor 165 by way of lead 166 and a suitable amplifier controls the platform about axis 13. Motor 165 is accordingly effective to maintain the output of pick-off 164 at a null.

The platform 10 also includes two accelerometer units indicated in Fig. 1 at 47 and 48 and in Fig. 5(a) by accelerometer A and accelerometer B. The correspondingly lettered accelerometer is associated with gyro A and gyro B. The accelerometers 47 and 48 carried by the platform 10 may be of the type shown and described in the U.S. Letters Patent No. 2,840,366 to Willis G. Wing for accelerometers issued June 24, 1958. As indicated, the accelerometers are responsive to accelerations in a plane parallel to the horizontal platform axes in respectively mutually perpendicular directions as indicated by arrows 45 and 46, accelerometer 47 sensing the accelerations affecting gyro A and accelerometer 48 sensing the accelerations affecting gyro B. The respective accelerometers 47 and 48 are sensitive to accelerations along their axes which are parallel to arrows 45 and 46. The housings of the respective accelerometers 47 and 48 are fixedly mounted on the platform 10 of the system in a suitable manner. The particular accelerometers employed as provided in the noted patent are of the integrating type so that the signal outputs thereof are proportional to the time integral of the acceleration that the respective accelerometers sense. The output of each accelerometer represents a component of the total linear velocity of the platform in space. In accordance with the teaching of the present invention each of the linear component velocities thus described is converted to a component of angular velocity in the form of a signal that is utilized to energize the torque motor of the corresponding gyro. In other words, the converted output of accelerometer 48 is utilized to energize the torquer 30 of gyro B. The converted output of the accelerometer 47 is similarly utilized to energize the torquer 23 of gyro A. The integrating accelerometers provide a velocity signal input means to the system having good short term characteristics. As the circuitry and elements included in the system for operating the respective gyros are identical, only the controls for gyro A are included in the drawings of the present application. These are shown in detail in Figs. 5(a) and 5(b) and are hereinafter described.

In order to understand the concept of the indicated vertical that the improved gyroscopic system establishes, it is necessary to examine the nature of gravity. Gravity is composed of two major forces whose resultant is approximately perpendicular to the surface of the earth. One of these forces is the force of mutual attraction between the earth and a stationary body on the surface of the earth. This force acts through the effective mass center of the earth and the stationary body. Because of the oblateness of the earth, the direction of the effective mass center varies as a direct function of latitude. The second force to be considered is the centrifugal force due to the daily rotation of the earth about its north-south axis.

One way of looking at the fact that Coriolis and centrifugal forces due to earth's rotation are not introduced as errors into the system is as follows: If a body were located in space away from the earth, its only atttraction to the earth would be with respect to the mass center of the earth. It would be independent of Coriolis and centrifugal forces due to the earth's rotation for it would be located away from the earth. If a platform were built to act this same way, it also would be independent of these earth's rotational errors. The platform component of the improved system has achieved the space effect by operating with space velocity components i.e., earth's rate plus ground speed directly in its accelerometers. It acts as a free space gyro in azimuth and works with respect to the mass attraction vertical.

A second explanation of the mass center vertical is that the accelerations sensed by the accelerometers as a result of platform rotation about its reference axis at earth's rate ($\Omega \sin \lambda_I$) are of just such magnitude as to be equal and opposite to the centrifugal acceleration acting on the same as a result of the earth's rotation. This can be visualized by noting that on the ground the platform would have to be slightly tilted from the plumb bob vertical in order to displace the accelerometers so they constantly read earth's rate as they are turning about the vertical axis of the ssytem at a rate of ($\Omega \sin \lambda_I$).

A simplified way to explain this characteristic of the system shows that for the case of flight at a constant latitude on the rotating earth, if the operation of the indicated vertical is assumed, the velocity output of the integrating accelerometers 47 and 48 is exactly correct. From this it is reasonable to assume that for a geographic or geocentric vertical, correct output from the accelerometers would not be obtained. In this connection, Fig. 3 illustrates the forces on the indicated type vertical platform 10 when a craft carrying the same is traveling a constant latitude course at constant altitude. The vector sum ($\Omega + \dot{\omega}$) of the earth's rate and craft velocity represents the total angular velocity of the platform as viewed from space. This vector is indicated by the arrow 49. Since acceleration is equal to the product of the effective earth's radius ($R_I$) and the square of the angular velocity, and the effective radius of a small circle at the indicated latitude ($\lambda_I$) is given by $R_I \cos \lambda_I$, the total acceleration ($A_n$) normal to the earth's north-south axis is given by:

$$A_n = (\Omega + \dot{\omega})^2 R_I \cos \lambda_I$$

or $$A_n = (\Omega^2 + 2\Omega\dot{\omega} + \dot{\omega}^2) R_I \cos \lambda_I$$

This equation can be expanded into the sum of the following three terms; $\Omega^2 R_I \cos \lambda_I$ which is equal to centrifugal acceleration due to earth's rate; $\dot{\omega}^2 R_I \cos \lambda_I$ which is equal to centrifugal acceleration due to the craft's motion; and $2\Omega\dot{\omega} R_I \cos \lambda_I$ which is equal to Coriolis acceleration due to craft motion over a rotating earth.

The vector designated $A_n$ is represented in Fig. 3 by the arrow 50. As shown in Fig. 3, the horizontal component ($A_h$) of acceleration which is sensed by the accelerometers 47 and 48 on the platfrom 10 is:

$$A_h = (\Omega + \dot{\omega})^2 R_I \cos \lambda_I \sin \lambda_I$$

This component indicated by arrow 51 in Fig. 3 represents the resultant of the acceleration components sensed by the accelerometers A and B on the platform. Since the platform turns about its vertical axis 13 at a constant rate equal to ($\Omega + \dot{\omega}$) $\sin \lambda_I$, indicated by arrow 52, the acceleration components "$A_A$" and "$A_B$" sensed by the respective accelerometers 47 and 48 are functions of time. Assuming that at zero time ($t$) the "A" accelerometer senses the total component ($A_h$) of acceleration and noting that the accelerometers are mounted in mutually perpendicular relation; the acceleration components ($A_A$ and $A_B$) are as follows:

$$A_A = A_h \cos[(\Omega + \dot{\omega}) \, t \sin \lambda_I]$$

and $$A_B = A_h \sin[(\Omega + \dot{\omega}) \, t \sin \lambda_I]$$

Since velocity is equal to the integral of the acceleration, the respective outputs of the integrating accelerometers 47, 48 for gyro A and B may be expressed as follows:

Output accelerometer 47 for "A" gyro =

$(\Omega + \dot{\omega})^2 R_I \cos \lambda_I \sin \lambda_I \cos[(\Omega + \dot{\omega}) \, t \sin \lambda_I] dt$
$\quad = (\Omega + \dot{\omega}) R_I \cos \lambda_I \sin[(\Omega + \dot{\omega}) \, t \sin \lambda_I]$ Output accelerometer 48 for "B" gyro =

$(\Omega + \dot{\omega})^2 R_I \cos \lambda_I \sin \lambda_I \sin[(\Omega + \dot{\omega}) \, t \sin \lambda_I] dt$
$\quad = (\Omega + \dot{\omega}) R_I \cos \lambda_I \{-\cos[(\Omega + \dot{\omega}) \, t \sin \lambda_I]\}$ The effective total linear velocity represented by the two accelerometers is equal to the resultant of the noted velocities, or Total linear velocity =
$$\sqrt{[(\Omega + \dot{\omega}) R_I \cos \lambda_I]^2 [\sin_n^2 + \cos_n^2]}$$

where $n = [(\Omega + \dot{\omega}) \, t \sin \lambda_I]$ or

Total linear velocity =
$$[(\Omega + \dot{\omega}) R_I \cos \lambda_I] = \Omega R_I \cos \lambda_I + \dot{\omega} R_I \cos \lambda_I$$

which is earth's rate + craft's velocity at constant altitude.

As represented in Fig. 3 the factor $\lambda_I$ is an angle of indicated latitude of the craft corresponding to the termed indicated radius $R_I$ of the earth. The latitude $\lambda_I$ differs from the geographic latitude of the craft by a maximum value of approximately six minutes of arc. The exact difference between the geographic vertical and the indicated vertical can be determined from Fig. 3 by neglecting the longitude term and noting that the gravity force consists of the mass attraction term together with the $\Omega^2 R_I \cos \lambda_I$ term. The resultant of these vectors becomes the total gravity vector and the relation of angles can easily be derived from this vector diagram. This factor is introduced in the system by a suitable corrector indicated at 53 in Fig. 5(a) for the output of a latitude computer 54.

To obtain angular velocity signals from the linear velocity outputs of the integrating accelerometers 47 and 48, the linear velocity is divided by the factor $R_I$ corresponding to the effective radius of the platform 10 to the instantaneous center about which the platform is turning. This noted center is the effective center of mass of the earth at the particular latitude of the craft and the factor $R_I$ is the distance of the craft or vehicle to such center. Where the vehicle is an aircraft, the altitude of the craft is included in determining the factor $R_I$.

Since the earth is an oblate spheroid, it contains only one great circle that is truly a circle. Apart from the equator, all other great circles are actually elliptical in nature. As a result, the system makes the conversion to angular velocity by dividing by the instantaneous radius of curvature which describes the change in direction of a curve at a point. As shown in Fig. 4, there are two effective radii of curvature at any point on the earth. The north-south radius of curvature ($P_{IN}$) describes the curvature of the constant longitude line 55 passing through a given point 56. The east-west radius of curvature ($P_{IE}$) describes the curvature of the great circle 57 which is perpendicular to the constant longitude line 55 at the point 56. The effective radius of the earth is defined in accordance with the present inventive concepts by two approximated radii of curvature components from a point such as point 56, on the earth's surface located in respective north-south and east-west vertical planes containing the craft. This defines the concept of the indicated earth's radius ($R_I$) in Fig. 3 and the basis for the term indicated vertical to which the system erects as hereinbefore set forth.

In determining the values of the approximations for the radii of curvature components utilized in the system, the fact that the accelerometers 47 and 48 do not operate in a north-south coordinate system must be considered. In the present system, the accelerometers operate in a coordinate system oriented at an angle D noted as the output of differential 58 (Fig. 5(a)). Angle D is measured about the reference axis 13 of the gyro platform 10 being determined by an initial setting angle $D_0$ from a setting input member 59 providing an input to the differential 58 and the factors earth's rate, longitude and latitude that are balanced by the system as the craft or vehicle pursues its course in space. For this reason, the platform system of coordinates determined by the spin axes of the respective gyros A and B with the aligned accelerometers 47 and 48 makes an angle D with respect to the north-south coordinates. The radii of curvature components are converted to the coordinates of the system, the values thereof being approximated in the following equations:

$P_{IA} = 3441.6 - 2.8 \cos 2\lambda_I - 2.8 \cos 2D - 2.8 \cos 2\lambda_I \cos 2D$ nautical miles $P_{IB} = 3441.6 - 2.8 \cos 2\lambda_I + 2.8 \cos 2D + 2.8 \cos 2\lambda_I \cos 2D$ nautical miles The cross product term noted in the above equations is not included in the system inasmuch as the damping reference utilized automatically corrects out any error resulting therefrom. This term only results in an error due to its deviation when damping is not applied in the system. Accordingly, any error resulting from the omission of this term is negligible. Also, in order to account for changes in the radii of curvature components due to the altitude of the craft or vehicle, the approximations made in the system for the effective earth's radius have the following values in nautical miles, where H represents altitude:

$P_{IA} = 3441.6 - 2.8 \cos 2\lambda_I - 2.8 \cos 2D + H$ and $P_{IB} = 3441.6 - 2.8 \cos 2\lambda_I + 2.8 \cos 2D + H$ The improved vertical reference defining system functions to maintain the platform 10 level and prevent oscillations thereof as represented by the change rate of the tilt angle $\gamma$ shown in Fig. 2. The following terms appearing in Figs. 5(a) and 5(b) represent values that are particularly used hereinafter in the description of the present subject matter:

$\dot{M}$—Angular velocity of platform in space.
$R_I \dot{M}$—Linear velocity of platform in space.
$\Omega$—Angular velocity of the earth.
$\gamma$—Tilt angle of platform 10 from indicated vertical.
$\gamma_R$—Rate of change of tilt angle or oscillation of platform.
Y—Linear velocity of craft in space.
$\dot{Y}$—Angular velocity of craft in space.
$\dot{\omega}$—Rate of change of longitude of the craft.
$\lambda_I$—Indicated latitude, and
$R_I$—Effective earth's radius.

The system includes means for providing signals in accordance with the angular velocity $\dot{M}$ of the platform in space. As shown in Fig. 5(a), this measurement is obtained from the accelerometer A and accelerometer B which are carried as heretofore described on the platfor 10 and are responsive to horizontal accelerations in respectively mutually perpendicular directions. The integrated output signals of the accelerometers 47, 48 per se provide measures of the linear velocity ($R_I \dot{M}$) of the platform in space and the respective output leads 60 and 61 therefrom are identified accordingly. To convert the linear velocity signals to angular velocity signals ($\dot{M}$), it is necessary to divide by the factor ($R_I$) representing the effective radius of the earth. This is accomplished for the "A" accelerometer in accordance with the heretofore derived equation $P_{IA} = 3441.6 - 2.8 \cos 2\lambda_I - 2.8 \cos 2D + H$ where the fixed radius of curvature factor is obtained from mixer 69, the variable altitude factor H is obtained from a variable potentiometer 62 responsive to the altitude of the craft, the indicated latitude factor $\lambda_I$ is obtained from a potentiometer 63 with a slider that is positioned by a servo 64 in accordance with the output of corrector 53 which represents $\lambda_I$, and the D factor is obtained from a third potentiometer 65 whose slider is positioned by the output of differential 58 in accordance with the required factor. As shown, the potentiometer 63 receives the output of accelerometer A by way of lead 60. The output of potentiometer 63 is fed to the potentiometer 62 by way of lead 66. Potentiometer 65 receives the output of potentiometer 62 by way of lead 67. The converted output of the accelerometer A representing the angular velocity $\dot{M}$ of the platform is utilized to energize the torque motor associated with the gyro A being fed thereto by way of lead 68, mixer 69, lead 70, amplifier 71 and lead 72. A similar conversion is employed for the signal $R_I \dot{M}$ of accelerometer B which is divided by the factors of the heretofore described equation $P_{IB} = 3441.6 - 2.8 \cos 2\lambda_I + 2.8 \cos 2D + H$. The indicated latitude factor $\lambda_I$ is introduced by means of a potentiometer 73 whose slider is driven by the servo 64 and connected to accelerometer B by lead 61. The fixed radius of curvature factor is obtained from a suitable mixer (not shown). The variable altitude factor H is obtained from a potentiometer 74 that is connected to potentiometer 73 by lead 75. Also, the D factor is obtained from a potentiometer 76 that is connected to potentiometer 74 by lead 77. The slider of potentiometer 76 is positioned in accordance wtih the output of differential 58. Like the "A" system represented, the output of potentiometer 76 is fed to a like system for controlling the torque motor 30 for the "B" accelerometer and gyro B as depicted in Fig. 1. The "B" system being a duplication of the "A" system is neither shown nor described furthermore herein in order to avoid unnecessary inclusion and over complication of the subject matter.

The variable portion of the factor D, as represented by $(\Omega+\dot{\omega}) \sin \lambda_I dt$ in Fig. 5(a) and shown by the vector 52 in Fig. 3, is indicative of motion of the platform 10 about its reference axis 13 as the craft moves in relation to the earth and as the earth rotates. This output from differential 58 is obtained from a motor 78 connected by its output shaft 79 to provide a second input to the differential. The motor 78 is operated from a suitable earth's rate computer 80 which supplies a signal ($\Omega$) representing earth's rate by way of lead 81 to a sine resolver 82 driven by the indicated latitude servo 64. The output of the resolver 82 representing $\Omega \sin \lambda_I$ is fed by way of lead 83 to a mixer 84 and to the motor 78 by way of amplifier 85. The component $\dot{\omega}$ is obtained by a suitable rate of change of longitude computer 86 whose output is fed to a sine resolver 87 by way of lead 88. Resolver 87 is also positioned by the servo 64. The output of the resolver $\dot{\omega} \sin \lambda_I$ is fed to the mixer 84 by way of lead 89. Speed regulation for the motor 78 is obtained by a velocity generator 90 whose output provides negative feedback, the generator being connected to the mixer 84 by way of lead 91. The generator 90 is located on the output shaft of the motor 78 and is driven by the same to provide a proportional output in accordance with the speed of operation of the motor.

The potentiometers 63, 62, 65, 73, 74 and 76 and the described devices for operating or setting the sliders thereof provide a means for modifying the signals of the accelerometers A and B to make the necessary conversion from linear velocity signals $R_I \dot{M}$ to angular velocity signals $\dot{M}$. This modification as noted is in accordance with the earth's rotation ($\Omega$), the rate of change of longitude ($\dot{\omega}$) of the craft, the indicated latitude $\lambda_I$ of the craft, the effective radius of the earth as defined by two approximated radii of curvature components from a point on the earth's surface located in respective north-south and east-west vertical planes containing the craft, and where necessary the altitude H of the craft. In the basic operation of the system, the modified accelerometer signals $\dot{M}$ as applied to the torque motors 23 and 30 effect precession of the gyros A and B at a rate that balances the effect on the system of the total angular velocity of the craft and earth. The platform 10 is accordingly controlled by the pick-offs 24, 31 and 164 and platform motors 34, 35 and 165 to maintain the reference established by the system. The platform 10 is controlled by the torque motors 23, 30, pick-offs 24, 31 and positioning motors 34, 35 to move about its reference vertical axis 13 at an angular rate corresponding and opposite to the rate that the platform 10 would move about the axis due to craft change in position. Gyro C effective about the vertical axis 13 moves with respect to the earth at a rate equal to $(\Omega+\dot{\omega}) \sin \lambda_I$ while providing stabilization about the noted axis. To effect this result, an input of this character as indicated at $K_C$ in Fig. 5(a) is fed the torque motor 163 of the gyro C by way of lead 187.

The described components function as a Schuler-tuned system which maintains a stable and accurate vertical reference with a minimum amount of error. Oscillations of the platform component of the system are represented by factor $\gamma_R$ or rate of change of the tilt angle $\gamma$, Fig. 2, of the platform 10. Such oscillations represent errors in the vertical defined by the system and it is necessary to control the system by damping so that the same is as relatively free of oscillation as possible. The total angular velocity $\dot{M}$ of the platform as heretofore described is employed to precess the gyros A and B to maintain the platform 10 erected as far as axis 13 is concerned. Value $\dot{M}$ can be considered as the vector sum of the angular velocity $\dot{Y}$ of the aircraft relative to the earth, of the earth's angular velocity ($\Omega$), oscillation of the platform 10 as represented by factor $\gamma_R$, and K a constant representing gyro drift and other constant errors. Therefore, $\dot{M} = \dot{Y} + \Omega + \gamma_R + K$ where $\gamma$ is the tilt angle of the platform from the indicated vertical, $\gamma_R$ is the rate of change of the angle $\gamma$ or oscillation of the platform.

The damping means of the improved system provides a signal proportional to the factor $\gamma_R$ that is fed as an input to the torque motor 23 of the gyro A element from a damping loop indicated in Fig. 5(b) at 92. The performance of the system depends on the quality and accuracy of the craft velocity reference provided to obtain a measure of the factor $\dot{Y}$ and a second earth's rate computer 93 provided to obtain a further measure of the factor ($\Omega$). As shown in Fig. 5(b), the craft velocity reference 94 may be a suitable Doppler radar reference 95 which provides a linear output signal measure of the ground speed $V_G$ of the craft to a high degree of accuracy. Alternatively, the reference may be provided by an airspeed reference 96 in the form of a suitable airspeed meter which provides a signal in accordance with the airspeed $V_A$ of the craft. Airspeed can be used by itself as a damping reference. In this case, the constant $K_D$ for damping is supplied by potentiometer 168. The important consideration for damping is the rate of change of the reference with respect to the rate of change of the signal to be damped rather than the absolute value. By modifying the output of the airspeed reference 96 by a signal device 97 providing a suitable wind correction, a measure of $\dot{Y}$ equal to $(V_A+W)$ and thus proportional to the ground speed of the craft forms a third craft velocity reference combination. When Doppler is used as a damping reference, potentiometer 106 provides continuous information to velocity output mixer 181 through lead 169, switch 170 and lead 171. The potentiometer 106 is also used as a feedback to mixer 98 in the damping loop. Under these conditions, the reference provides reliable long term data and the output of potentiometer 106 corrects long term errors in the system. When airspeed or airspeed plus wind are used in damping references, then the information in potentiometer 106 is stored and potentiometer 168 is actively connected to the damping loop through mixer 98. The stored information in potentiometer 106 continues to go into mixer 181 thereby correcting for long term errors as of the point when the airspeed reference was initiated. This is because although it is useful in most cases for damping, it is not accurate in most cases for velocity error correction. The craft velocity reference 94 provides an input to the system having good long term characteristics.

The system may also be damped where the factor $\dot{Y}$ is zero and the craft is grounded in relation to the earth. With airframe damping, the characteristic equation is $\gamma_R = \dot{M} - \Omega - K$. With damping in accordance with the airspeed reference 96, $\dot{Y}$ is equal to $V_A/R_I$ and the characteristic equation is $\gamma_R = \dot{M} - \Omega - (V_A/R_I) - K$. With damping in accordance with the airspeed reference 96 and the wind corrector 97, $\dot{Y}$ is equal to $(V_A+W)/R_I$ and the characteristic equation is $$\gamma_R = \dot{M} - \Omega - (V_A+W)/R_I - K$$

With damping in accordance with the Doppler radar reference 95, $\dot{Y}$ is equal to $(V_G/R_I)$ and the characteristic equation is $\gamma_R = \ddot{M} - \Omega - (V_G/R_I) - K$. Due to the statistical nature of the signal derived from the Doppler radar reference, its accuracy increases as it is used over longer periods of time since it is able to sample more data. This type of reference is the most accurate but it has the disadvantage of not being usable where radar silence must be observed. The less accurate alternate references are consequently also included in the system. If no accurate reference signal is available due to radar silence restrictions and if airspeed data is not very reliable at a given time, then damping can be removed from the system by opening switches 143 and 112. The Schuler tuned data from the accelerometer 47 through the radius correction circuits, 63, 62 and 65, through mixer 69, lead 70, amplifier 71 can continue to feed torque motor 23 together with previous stored constant error information in potentiometer 139 which feeds the mixer 69 through lead 172, switch 173, lead 174, and lead 178. The velocity output on lead 182 from mixer 181 would continue to be fed from lead 184 through switch 183, and lead 180. Also stored information from potentiometer 106 and potentiometer 139 into mixer 181 would correct out previous long term errors up to the point of the initiation of the operation without damping. The length of time that operations can continue in this process without damping depends upon the accuracy of the inertial loop as compared with the accuracy desired. The damping may be used at any time to restore the long term accuracy of the inertia loop whereupon it can be removed again.

The system utilizes the airframe type of damping when the craft is on the ground since ground speed is then known to be equal to zero. The damping means in the system under the two basic types of damping provided, namely the normal damping with only the rate of change of difference signal applied or the rapid damping with both the difference signal and the rate of change of difference signal applied is adjustable to three basic values, critical, or relatively heavy, normal, or relatively light, and no damping. The system is not damped under conditions of operation where an accurate velocity reference is not available. When an accurate ground speed reference is available such as the Doppler radar reference, the damping control knob 111 is preferably set to critical position and the Doppler radar velocity reference 95 is included in the system. Where the Doppler radar reference cannot be used, the airspeed reference 96 and wind correction device 97 are utilized to measure the ground speed of the craft. Under these conditions, the damping control knob 111 could be used in either the normal or critical positions depending on the accuracy of the reference data at a particular time. When the alternate velocity reference is used and it is necessary to change the setting of the wind correction device 97, the damping for the system is reduced to zero since the corrections involved would introduce disturbances into the system.

The damping utilized prevents oscillations of the platform 10 and functions to maintain the tilt angle $\gamma$ at a zero condition. It is necessary to provide critical as well as normal damping in the system in order to correct the same for transient errors due to less than perfect signals from the velocity reference 94. Critical or relatively heavy damping produces a condition where these errors disappear in a minimum amount of time. Normal or relatively light damping is a condition where the damping factor is reduced and the effect of transient errors in the velocity reference is similarly reduced. With normal damping a larger time is necessarily required to eliminate the transient errors. Zero damping completely eliminates the damping effect but allows any oscillation in the system to persist unchecked. The system is set to utilize critical damping where the craft is grounded and the airspeed reference is zero or where the craft is airborne and the Doppler radar velocity reference 95 or other accurate damping reference is employed. Normal damping is utilized with the airspeed reference 96 as corrected by the wind correction device 97.

As shown in Fig. 5(b), the damping loop 92 includes a mixer 98 that receives a control signal by way of lead 99 from amplifier 100 and mixer 101. The output of the mixer 98 fed to amplifier 102 by connecting lead 103 causes operation of a motor 104. The motor 104 in turn drives a speed generator 105 and the slider of either potentiometer 106, 168 or 139 as the case may be through connected shafting 107. The output of potentiometer 106 is fed back to the mixer 98 to null the input signal from amplifier 100 being connected thereto by way of lead 108, closed switch 109, a closed two position switch 188, and lead 110. The output of potentiometer 168 when it is used is fed back to the mixer 98 through lead 167, and switch 188 which is then closed in its second position. The generator 105 provides the damping signal of the loop 92 which is proportional to the noted factor $\gamma_R$. This factor as shown for system "A" is modified to provide either relatively critical, relatively normal or no damping as determined by the setting of a damping control knob 111 which sets a three position switch 112. In Fig. 5(b), the control knob 111 and switch 112 are set in the critical damping position, the output of the generator 105 being supplied as in input to the torque motor 23 for gyro A by way of generator output winding 113, lead 114, closed switch 112, constant $K_2$ shown at 115, lead 198, closed switch 199, lead 200, lead 116, 180° phase shifter 117, lead 118 to mixer 69, lead 70, amplifier 71 and lead 72. Normal damping is provided by changing knob 111 to the normal position and closing the switch 112 to include constant $K_3$ shown at 119', lead 201, closed switch 202, and lead 203 to lead 116 closing the circuit to the torque motor 23. In the "off" position of the knob 111, the switch 112 breaks the connection between leads 114 and 116 and no damping input is provided for the system. The above occurs under the condition when the period control knob 137 is set in the normal position.

The $\ddot{M}$ factor as represented in the damping equations for the system $\gamma_R = \ddot{M} - \Omega - K$; $\gamma_R = \ddot{M} - \Omega - V_A/R_I - K$;

$$\gamma_R = \ddot{M} - \Omega - (V_A + W)/R_I - K$$

and $$\gamma_R = \ddot{M} - \Omega - V_G/R_I - K$$

is provided as in input to the damping loop 92 obtained as a feedback from the output of the amplifier 71 which is fed by way of lead 119 connected to lead 72, through closed switch 120 and lead 121 to the mixer 101. Inasmuch as the damping signal $\gamma_R$ is also included in the feedback leads 119, 121 described in which the signal is represented as $M + \gamma_R + K$, it is necessary to subtract $\gamma_R$ and $K$ therefrom to provide the proper input to the damping loop. This is accomplished by feeding the damping signal negatively to the mixer 101 by way of lead 122 on the input side of the phase shifter 117, the closed switch 123 and lead 124. The signal $\gamma_R$ is also fed to mixer 98 from lead 122 by way of connecting lead 125. The constant factor $K$ is subtracted by utilizing the signal in potentiometer 139 representing the critical constant error of the system. This is effected through lead 204, closed switch 205, and lead 206 to mixer 101. Constant errors developed after the storage in potentiometer 139 will be contained as an inherent component of the signal from accelerometer 47.

With airframe damping $\gamma_R = \ddot{M} - \Omega - K$, the factor $\Omega$ providing a measure of the angular velocity of the earth is obtained from computer 93 by way of leads 126, 127, resolver 128 and lead 129 to the mixer 101. Resolver 128 is controlled by the output of differential 58 in accordance with the factor $D$ and also provides an output for the "B" system as represented in Fig. 5(a) by way of lead 130. The angular velocity of the platform with the craft stationary is measured by the net signal input $\dot{M}$ to the mixer. Computer 93 provides a signal means for measuring the angular velocity of the earth. Any difference between the noted input signals to the mixer 101 results in an output to amplifier 100 and an input to the mixer 98 and amplifier 102 of the damping loop that drives the motor 104, generator 105 and potentiometer 106. In this mode due to the accuracy of the velocity reference only potentiometer 106 is driven by the motor 104. The damping loop 92 by way of generator 105 then provides a signal input to the torque motor 23 of gyro A in accordance with the rate of change of the difference between the controlling signals $\dot{M}$, $\Omega$, and K. With this type of damping, the knob 111 is located in the critical damping position. With knob 111 so located, constant $K_2$ represented at 115 is in the path to mixer 69. Also under these conditions, the signal from potentiometer 139 is fed to mixer 101 as heretofore described.

With the craft airborne, the Doppler radar velocity reference 95 may be included in the system. The linear velocity output of this ground speed reference is represented by $V_G$ in the equation $\gamma_R = \dot{M} - \Omega - V_G/R_I - K$. This signal is added to the signal $\Omega$ to the resolver 128 after multiplication by a factor $(1/R_I)$ obtained from a computer 131 with inputs provided by the factors $\lambda_I$, H and D. The connection between computer 131 and Doppler radar reference 95 is provided by lead 132, a three position switch 133 located in its central or "off" position as viewed in Fig. 5(b) and lead 134. The provided input to mixer 101 by way of lead 129 from resolver 128 is represented as $\Omega$ and $V_G/R_I$. The constant factor K is subtracted by utilizing the signal on potentiometer 139 representing the initial constant error of the system. This is effected through lead 204, closed switch 205, lead 206 to mixer 101. Constant errors developed after the storage in potentiometer 139 will be contained as an inherent component of the signal from accelerometer 47. In this mode of operation, the damping means provides an input signal $\gamma_R$ to the torque motor 23 for gyro A that is in accordance with the rate of change of the difference between the angular velocity of the platform in space $\dot{M}$ and the combined angular velocity signals of the craft $V_G/R_I$, the earth ($\Omega$) and the constant K. The computer 131 of the system provides a means for converting the linear ground speed signal of the Doppler radar reference $V_G$ to an angular ground speed signal $V_G/R_I$. In the described form of the invention, the converted signal of the linear ground speed reference 95 is combined with the earth's angular velocity signal $\Omega$ and compared with the angular velocity $\dot{M}$ of the platform and the constant K provided from potentiometer 139. The rate of change of the difference between the noted signals provides the damping input to the system obtained through the damping loop 92.

With the switch 133 closed in the right hand position in Fig. 5(b), the airspeed reference signal $V_A$ is included in the system in place of signal $V_G$. When used alone, the reference signal $V_A$ fed by way of lead 135 to switch 133, lead 134, computer 131, lead 127 and lead 129 is converted to an angular velocity signal and combined with the angular earth's rate signal ($\Omega$) before entering the mixer 101 for comparison with the net platform angular velocity signal $\dot{M}$. In the manner heretofore described, the damping loop 92 senses the difference between the compared signal and operates accordingly to provide the rate damping signal $\gamma_R$. The wind correction device 97 is normally used with the airspeed reference 96, this correction being included in the system when switch 136 is closed. The input to mixer 101 from the reference 94 is then represented by the factors $\Omega$ and $(V_A+W)R_I$. By setting the respective switches 133 and 136, the input to the mixer 101 leading to the damping loop 92 may take any one of four values as represented in the drawing adjacent lead 129. With the system in use and reference 94 included in one of its forms in the system, the elements of the system feeding lead 129 form a signal means for providing a measure of the angular velocity of the craft $\dot{Y}$ and earth ($\Omega$). The system normally functions with the inputs to mixer 101 determining the basis of the difference signal used to supply the required input to the damping loop. In the steady state, the output of the generator 105 is zero, the tilt angle of the platform 10 is zero and the platform 10 is free of oscillation $\gamma_R$. The means provided in the system for changing the period of the system to obtain quick levelling of the platform when desired is normally ineffective. Rapid erection of the system is usually accomplished with the craft grounded or stationary in relation to the earth where $\dot{Y}$ or $V_G/R_I$ is zero and the only possible error in the velocity reference arises in the computation of earth's rate. If it is necessary to erect the platform 10 quickly when the craft is airborne or moving in relation to the earth, the system utilizes the velocity reference 94 to supply the necessary velocity information. Reference 94 provides a velocity signal input to the system having good long term characteristics.

The period of the system is not altered by increasing or decreasing the damping factor introduced in the system by the adjustable control knob 111 and switch 143. The normal Schuler-tuning period remains unaffected regardless of the damping constants used. The period of the system is materially reduced by providing difference and rate of change of difference input signals to the mixer 69 of the system. The difference signal is obtained from the output of amplifier 100, through lead 99, lead 146, closed switch 143, lead 186, constant $K_I$ at 185, lead 147 to switch 207 to lead 211 or from lead 186 to lead 209, to constant $K_6$ at 212 through switch 208, lead 210 to lead 211. The rate of change of difference input signal to mixer 69 of the system is obtained from the output winding 113 of speed generator 105, lead 114, switch 112 and either through lead 197, constant $K_4$ at 191, switch 190, lead 189, through lead 116, phase shifter 117 and mixer lead 118 or through lead 196, constant $K_5$ at 195, lead 194, switch 193, lead 192 and lead 116 to phase shifter 117 and mixer lead 118.

In the normal mode of operation as heretofore described the period of oscillation of the system is approximately 84 minutes. This condition takes longer to settle out errors as well as introduce them due to reference errors, than the rapid damping condition which is now described. Under normal mode damping, the time required to establish an initial erection of the platform consumes a relatively long time. The rapid damping significantly reduces this time by changing the period of oscillation of the system without basically effecting the Schuler tuning.

The period changeover means provided in the system includes a two position, period control, knob 137 shown in Fig. 5(b) as set in the normal period position. Operation of the knob 137 manually to its rapid period position functions to close switch 138 to connect the potentiometer 139 in the feedback position of loop 92. Potentiometer 139, under this condition, has its slider driven by motor 104. It is connected to mixer 98 by way of lead 140, closed switch 138 and lead 141. The normally closed switch 109 of the loop 92 is simultaneously opened so that the potentiometer 106 is disconnected. The output $\gamma_R$ from generator 105 as modified by either damping constant $K_4$ or $K_5$ provides an input to the mixer 69 whose gain exceeds that of the gain of the $\dot{M}$ signal thereto from potentiometer 65 by way of lead 68. This is also true of the difference signal which goes to mixer 69 by way of constant $K_I$ or $K_6$.

In the quick erecting mode, knob 137 also operates to open the switch 123 to the mixer 101 so that the $\gamma_R$ signal thereto is disconnected. This signal continues to be fed to the damping loop mixer 98 by way of lead 125. Operation of the knob 137 further opens the normally closed switch 120 so that the $\dot{M}+\gamma_R$ signal to the mixer 101 is also disconnected. The change over knob 137 when set in rapid period position also closes the normally open switches 142 and 143. Closed switch 142 directly connects the accelerometer A to the mixer 101 by way of lead 60, lead 144, switch 142 and lead 145. The closure of switch 143 connects the output of amplifier 100 to the mixer 69 feeding the torque motor 23 of gyro A. This connection is by way of lead 99, lead 146, switch 143, lead 186, through either $K_I$ or $K_6$ then through lead 211 to mixer 69. The shafting 148 connects the period control knob 137 with the blades of the respective switches 109, 138, 123, 143, 120 and 142. Knob 137 also opens switches 199 and 202 and closes 190 and 193 when in the rapid damping position. In the rapid erection condition the output mixed velocity is not used because it is erroneous during this period. As such, switches 183, 170 and 173 are open.

The reason that the connections to the mixing circuits are physically different in this rapid damping mode from the normal mode is because an unstable condition could result from using the connections shown in the normal mode in their exact physical connection in the rapid damping mode.

With the normal period system controls rendered temporarily ineffective, the controlling operatively connected inputs to the torque motor 23 by way of mixer 69 include the basic signal $\dot{M}$ by way of lead 68 from potentiometer 65. As represented, the factor $\dot{M}$ is in accordance with the angular velocity of the platform in space indicated by the accelerometer 47. A second signal input to the torquer 23 is fed by way of either constants $K_I$ or $K_6$, switch 143 and lead 146 to lead 99. This signal is in accordance with the difference between a signal proportional to the velocity of the platform in space as represented by the accelerometer 47 and a signal from resolver 128 to mixer 101 equal to the combined velocities of the craft and earth as represented by $\dot{Y}$ and $(\Omega)$, or a signal in accordance with the velocity of the earth alone as represented by $(\Omega)$. The third input signal to the torque motor 23 is in accordance with the output of the modified damping loop is represented by factor $\gamma_R$ which is in accordance with the rate of change of the difference between the accelerometer signal and $\dot{Y}$ with $(\Omega)$ or $(\Omega)$ alone as determined by the output of the mixer 101 and amplifier 100. The direct utilization of the accelerometer outputs of the system insures that the platform 10 is properly leveled in the rapid erection mode of operation of the variable period gyroscopic system. At the same time the torque motor 23 energized by the factor $\dot{M}$ establishes this phase of operation of the system. As soon as the indicated vertical is established, the period control knob 137 could be turned back to its normal period position or could be left in the rapid period position for use in the rapid damping mode, whence the system functions under normal use conditions. Due to the lower period means incorporated in the system, the gyro-stabilized platform is able to reach an established operating condition within a much shorter time after it is initially energized.

The rapid damping mode is the third basic mode of operation. This is similar in damping characteristics to the rapid erection mode but it differs from rapid erection in that it is used during normal operation of the system. The rapid damping mode allows the period of oscillation of the system to be reduced without effecting the basic Schuler tuning. It supplies an accurate velocity output and is generally an improved system when operating with a reasonably accurate reference velocity at least as far as long term characteristics are concerned. The features of being able to use the damping reference intermittently to correct system errors as well as all other performance advantages indicated for the normal mode of operation are also contained in this mode.

In the rapid damping mode, the period control knob 137 is in the rapid position and functions the same as it did under rapid erection except for the following conditions. The velocity output switches 183 and 173 are closed. This allows the resultant of the mixture of the inertial and damping reference signals to become a useful output through lead 182. The damping factor can be chosen by either using constants $K_I$ and $K_4$ which represent critical or relatively heavy damping or constants $K_6$ and $K_5$ which represent relatively light damping. The damping reference inputs from velocity reference 94 may be utilized in a like manner as heretofore described in the normal mode of operation.

Fig. 6 represents a simplified flow diagram of operation of the system in the normal mode. This diagram shows the basic Schuler tuning loop as always being connected directly from accelerometer 47 through $1/R_I$ multiplier 63, 62, 65 and 69 to torquer 23 by way of mixer 69, 71. The damping is obtained by comparing the reference velocity 94, 93, 128, 131 with respect to the accelerometer data 47, 63, 62, 65, 69 through mixer 101, 100. The rate of change of the difference is fed through a constant 115, 119 to mix with the accelerometer data 69, 71 whereupon it also feeds torquer 23. The velocity output appears at mixer 181.

Fig. 7 represents a simplified flow diagram of operation of the system in the rapid erection mode. This diagram shows the basic Schuler tuning loop as always being connected directly from accelerometer 47 through $1/R_I$ multiplier 63, 62, 65 and 69 to torquer 23 by way of mixer 69, 71. The damping is obtained by comparing the reference velocity 94, 93, 128, 131 with respect to the accelerometer data 47, 63, 62, 65, 69 through mixer 101, 100. The difference is fed through constants 185 and 212 to mixer 69, 71 whereupon it also feeds torquer 23. The rate of change of the difference is also fed through constants 191 and 195 to mixer 69, 71, whereupon it also feeds torquer 23.

Fig. 8 represents a simplified flow diagram of operation of the system in the rapid damping mode. This diagram shows the basic Schuler tuning loop is always being connected directly from accelerometer 47 to mixer 69, 71 and thence to torquer 23. The damping is obtained by comparing the reference velocity 94, 93, 128, 131, with respect to the accelerometer data 47 through mixer 101, 100. The difference is fed through constants 185, 212 to mixer 69, 71 whereupon it also feeds torquer 23. The rate of change of the difference is also fed through constants 191, 195 to mixer 69, 71 whereupon it also feeds torquer 23. The velocity output appears at 182. The velocity control input from the accelerometers 46, 47 of the system has good short term characteristics. The craft velocity reference 94 provides a velocity output utilized by the system that has good long term characteristics. The gyroscopic pendulum component of the system as controlled by both of the noted velocity outputs provides both good short and long term characteristics and an output measure of the velocity of the craft.

Since many changes could be made in the improved system and many apparently widely different embodiments of the invention could be made without departing from the scope thereof, it is intended that all matter contained in the above description or shown in the accompanying drawings shall be interpreted as illustrative and not in a limiting sense.

What is claimed is:

1. A Schuler tuned gyroscopic reference system for a dirigible craft comprising a gimbal mounting movable in relation to the craft about an azimuth axis, a platform carried by said gimbal mounting movable about two mutually perpendicular, normally horizontal, axes and a vertical reference axis, a pair of gyros providing gyroscopic stabilization for said platform about the horizontal mounting axes thereof having precession axes and mutually perpendicular spin axes, a pick-off for each of the gyros providing a signal measuring gyro displacement from a reference condition about the respective precession axes, a motor for positioning the platform about one of its horizontal axes, a motor for positioning the platform about the other of its horizontal axes, a variable coupling between the respective motors and pick-offs apportioning the signals of the pick-offs in accordance with the orientation of the platform relative to the gimbal mounting about the reference axis, a third gyro providing gyroscopic stabilization about the vertical reference axis having a mounting axis on the platform, a pick-off for the third gyro providing a signal measuring gyro displacement from a reference condition about its mounting axis, a motor connected to the platform about its vertical reference axis controlled by the signal of the third gyro pick-off; means for providing signals in accordance with the angular velocity of the platform in space including a pair of accelerometers carried by said platform responsive to accelerations in a plane parallel to the horizontal axes of the platform in respectively mutually perpendicular directions, and means for modifying the signals of the accelerometers in accordance with the earth's rotation, the rate of change of longitude of the craft, the latitude of the craft, the effective radius of the earth as defined by two approximated radii of curvature components from a point on the earth's surface located in respective north-south and east-west vertical planes containing the craft, and the altitude of the craft; and a torque motor at the precession axis of each of said pair of gyros operated by the respective signals of said angular velocity signal means, said torque motors effecting precession of the pair of gyros at a rate that balances the effect thereon of the total angular velocity of the craft and earth, the third gyro acting as a free gyro in space, the net effect on the platform being to produce a vertical with respect to the effective mass center of the earth.

2. A system of the character claimed in claim 1, including means for providing an input to said torque motors for damping the system.

3. A Schuler tuned system of the character claimed in claim 1 having an undamped period of approximately 84 minutes, including normally ineffective means for lowering the period of the system below 84 minutes without disturbing the Schuler tuning, and means for rendering said period lowering means effective.

4. A system of the character claimed in claim 1, including output means providing a measure of the instantaneous velocity of the craft.

5. A Schuler tuned gyroscopic system for dirigible craft comprising a mounting, a platform carried by said mounting movable about a normally horizontal axis, gyroscopic means carried by said platform providing stabilization about its horizontal axis having mutually perpendicular precession and spin axes, a pick-off for said gyroscopic means providing a signal measuring displacement from a reference condition about the precession axis, a motor for positioning the platform about its horizontal axis operatively connected to said pick-off, signal means for measuring the angular velocity of the platform in space including an accelerometer carried by the platform responsive to accelerations in a horizontal plane parallel to the platform axis, and means for modifying the signal of the accelerometer in accordance with the earth's rotation, the rate of change of longitude of the craft, the latitude of the craft, and the effective radius of the earth as defined by two approximated radii of curvature components from a point on the earth's surface located in respective north-south and east-west vertical planes containing the craft; and a torque motor at the precession axis of said gyroscopic means operatively connected to said angular velocity signal means, said platform being controlled by said torque motor, pick-off and positioning motor, the net effect on the platform being to produce a vertical with respect to the effective mass center of the earth.

6. A system of the character claimed in claim 5, including means for further modifying the signal of the accelerometer in accordance with the altitude of the craft.

7. A system of the character claimed in claim 5, including adjustable means operatively connected to said torque motor for damping the system.

8. A Schuler tuned system of the character claimed in claim 5, having an undamped period of approximately 84.4 minutes, including normally ineffective means operatively connected to said torque motor for lowering the period of the system without disturbing the Schuler tuning, and means for rendering said period lowering means effective.

9. A system of the character claimed in claim 5, including output means providing a measure of the instantaneous velocity of the craft.

10. In a gyroscopic system for dirigible craft, a platform mounted on the craft movable about a horizontal axis, gyroscopic means carried by said platform providing stabilization about the horizontal axis of the platform having a precession axis normal to its spin axis, a torque motor at the precession axis of said gyroscopic means, means for providing a first input signal to said torque motor in accordance with the angular velocity of the platform in space, signal means for providing a measure of the angular velocity of the craft and the earth, and means for damping the gyroscopic system providing a second signal input to said torque motor in accordance with the rate of change of the difference between the signals of said platform velocity signal means and said craft and earth velocity signal means.

11. A system of the character claimed in claim 10, including means for modifying the input signal to said torque motor from said damping means to provide critical damping for the gyroscopic system.

12. A system of the character claimed in claim 10, including means for rendering said damping means ineffective.

13. In a gyroscopic system for dirigible craft, a platform mounted on the craft movable about a horizontal axis, a gyroscopic means carried by said platform providing stabilization about the horizontal axis of the platform having a precession axis, a torque motor at the precession axis of said gyroscopic means, means for providing a first input signal to said torque motor in accordance with the angular velocity of the platform, reference signal means for providing a measure of the angular craft velocity, means for damping the gyroscopic system providing a second signal input to said torque motor in accordance with the difference between the signals of said platform velocity signal means and said reference velocity signal means, and second means for damping the gyroscopic system providing a third signal input to said torque motor in accordance with the rate of change of the difference between the signals of said platform velocity signal means and said reference velocity signal means.

14. In a gyroscopic system for dirigible craft, a platform mounted on the craft movable about a horizontal axis, gyroscopic means carried by said platform providing stabilization about the horizontal axis of the platform having a precession axis normal to its spin axis, a torque motor at the precession axis of said gyroscopic means, means for providing a first input signal to said torque motor in accordance with the angular velocity of the platform with the craft stationary, signal means for providing a measure of the angular velocity of the earth, means for damping the gyroscopic system providing a second signal input to said torque motor in accordance with the difference between the signals of said platform velocity signal means and said earth velocity signal means, and means for damping the gyroscopic system providing a third signal input to said torque motor in accordance with the rate of change of the difference between the signals of said platform velocity signal means and said earth velocity signal means.

15. In a gyroscopic system for dirigible craft, a platform mounted on the craft movable about a horizontal axis, gyroscopic means carried by said platform providing stabilization about the horizontal axis of the platform having a precession axis normal to its spin axis, a torque motor at the precession axis of said gyroscopic means, means for providing a first input signal to said torque motor in accordance with the angular velocity of the platform in space, doppler radar means providing a signal in accordance with the linear ground speed of the craft, means for converting said linear ground speed signal to an angular ground speed signal, signal means for providing a measure of the angular velocity of the earth, and means for damping the gyroscopic system providing a second signal input to said torque motor in accordance with the rate of change of the difference between the signal of said platform velocity signal means and the combined signals of said converting means and earth velocity signal means.

16. A system of the character claimed in claim 15 including second means for damping the gyroscopic system providing a third signal input to said torque motor in accordance with the difference between the signal of said platform velocity signal means and the combined signals of said converting means and earth velocity signal means.

17. In a gyroscopic system for dirigible craft, a platform mounted on the craft movable about a horizontal axis, gyroscopic means carried by said platform providing stabilization about the horizontal axis of the platform having a precession axis normal to its spin axis, a torque motor at the precession axis of said gyroscopic means, means for providing a first input signal to said torque motor in accordance with the angular velocity of the platform in space, reference means providing a signal in accordance with the linear air speed of the craft, means for converting said linear air speed signal to an angular air speed signal, signal means for providing a measure of the angular velocity of the earth, and means for damping the gyroscopic system providing a second signal input to said torque motor in accordance with the rate of change of the difference between the signal of said platform velocity signal means and the combined signals of said converting means and earth velocity signal means.

18. A system of the character claimed in claim 17 including second means for damping the gyroscopic system providing a third signal input to said torque motor in accordance with the difference between the signal of said platform velocity signal means and the combined signals of said converting means and earth velocity signal means.

19. In a gyroscopic system for dirigible craft, a platform mounted on the craft movable about a horizontal axis, gyroscopic means carried by said platform providing stabilization about the horizontal axis of the platform having a precession axis normal to its spin axis, a torque motor at the precession axis of said gyroscopic means, means for providing a first input signal to said torque motor in accordance with the angular velocity of the platform in space, reference means providing a signal in accordance with the linear ground speed of the craft, means for converting said linear ground speed signal to an angular ground speed signal, signal means for providing a measure of the angular velocity of the earth, and means for damping the gyroscopic system providing a second signal input to said torque motor in accordance with the rate of change of the difference between the signal of said platform velocity signal means and the combined signals of said converting means and earth velocity signal means.

20. A system of the character claimed in claim 19, including second means for damping the gyroscopic system providing a third signal input to said torque motor in accordance with the difference between the signal of said platform velocity signal means and the combined signals of said converting means and earth velocity signal means.

21. In a gyroscopic system for dirigible craft, the combination of, a platform mounted on the craft movable about a horizontal axis, gyroscopic means carried by the platform providing stabilization about the horizontal axis having a precession axis normal to its spin axis, a torque motor at the precession axis of said gyroscopic means, means providing a first input signal to said torque motor in accordance with the angular velocity of the platform in space, means providing a second input signal to said torque motor in accordance with the difference between a signal proportional to the linear velocity of the platform in space and a signal proportional to the combined angular velocities of the craft and earth, and means providing a third input signal to said torque motor in accordance with the rate of change of the difference between the signal proportional to the linear velocity of the platform in space and the signal proportional to the combined angular velocities of the craft and earth.

22. In a gyroscopic system for dirigible craft, the combination of, a platform mounted on the craft movable about a horizontal axis, gyroscopic means carried by said platform providing stabilization about the horizontal axis of the platform having a precession axis normal to its spin axis; signal means for providing a measure of the angular velocity of the platform in space including an accelerometer carried by the platform responsive to acceleration in a horizontal plane including the axis of the platform, and means for modifying the signal of the accelerometer in accordance with the effective radius of the earth as defined by two approximated radii of curvature components from a point on the earth's surface located in respective north-south and east-west vertical planes containing the craft, the latitude of the craft, the earth's rotation and the rate of change of longitude of the craft; and a torque motor at the precession axis of said gyroscopic means operatively connected to said platform angular velocity measuring means.

23. A system as claimed in claim 22, in which the modifying means for the signal of said accelerometer also includes means for adjusting the signal in accordance with the altitude of the craft.

24. In a gyroscopic system for dirigible craft, the combination of, a platform mounted on the craft movable about a horizontal axis, gyroscopic means carried by said platform providing stabilization thereof about the horizontal axis of the platform having a precession axis normal to its spin axis; signal means for providing a measure of the angular velocity of the platform in space including an accelerometer carried by the platform responsive to acceleration in a horizontal plane including the axis of the platform, and means for modifying the signal of the accelerometer in accordance with the effective radius of the earth as defined by two approximated radii of curvature components from a point on the earth's surface located in respective north-south and east-west vertical planes containing the craft; and a torque motor at the precession axis of said gyroscopic means operatively connected to said platform angular velocity measuring means.

25. In a gyroscopic system for dirigible craft, the combination of, a platform mounted on the craft movable about a horizontal axis, gyroscopic means carried by said platform providing stabilization thereof about the horizontal axis of the platform having a precession axis normal to its spin axis; signal means for providing a measure of the angular velocity of the platform in space including an accelerometer carried by the platform responsive to acceleration in a horizontal plane including the axis of the platform, and means for modifying the signal of the accelerometer in accordance with the latitude of the craft, the earth's rotation and the rate of change of longitude of the craft; and a torque motor at the precession axis of said gyroscopic means operatively connected to said platform angular velocity measuring means.

26. In a Schuler tuned gyroscopic system for dirigible craft, a platform mounted on the craft movable about a horizontal axis, gyroscopic means carried by said platform providing stabilization about the horizontal axis of the platform having a precession axis normal to its spin axis, a torque motor at the precession axis of said gyroscopic means, means for providing an input signal to said torque motor in accordance with the angular velocity of the platform in space whereby the system normally operates with a period of approximately 84 minutes, normally ineffective signal means operatively connected to the torque motor for reducing the period of the system without effecting the Schuler tuning thereof, and period changing means operable to render said normally ineffective means effective.

27. A Schuler tuned gyroscopic system for a dirigible craft comprising a platform mounted on the craft movable about a horizontal axis, gyroscopic means carried by said platform providing stabilization about the horizontal axis of the platform having a precession axis normal to its spin axis, a pick-off for the gyroscopic means providing a signal measuring displacement from a reference condition about its precession axis, a motor for positioning the platform about its horizontal axis operated by the signal of said pick-off, means for providing a signal in accordance with the angular velocity of the platform in space, and a torque motor at the precession axis of said gyroscopic means operated by the signal of said angular velocity signal means.

28. A Schuler tuned gyroscopic system for a dirigible craft comprising a platform mounted on the craft movable about a horizontal axis, gyroscopic means carried by said platform providing stabilization about the horizontal axis having a precession axis normal to its spin axis, a pick-off for the gyroscopic means providing a signal measuring displacement from a reference condition about its precession axis, a motor for positioning the platform about its horizontal axis operated by the signal of said pick-off, means for providing a signal in accordance with the angular velocity of the platform in space, a torque motor at the precession axis of said gyroscopic means having a first input from the platform velocity signal means, signal means for providing a measure of the angular velocity of the craft and the earth, and means for damping the gyroscopic system providing a second signal input to said torque motor in accordance with the rate of change of the difference between the signals of said platform velocity signal means and said craft and earth velocity signal means.

29. A system as claimed in claim 28, including second means for damping the gyroscopic system providing a third signal input to said torque motor in accordance with the difference between the signals of said platform velocity signal means and said craft and earth velocity signal means.

30. A Schuler tuned system for measuring the velocity of a craft comprising, reference means for deriving a first signal in accordance with the speed of the craft having good long term characteristics, means for deriving a second speed signal having good short term characteristics, and a gyro stabilized platform controlled by both said first and second signal means providing both good short and long term characteristics and an output measure of the velocity of the craft.

31. A system of the character claimed in claim 30, including means for damping the Schuler tuned system providing a first damping signal input thereto in accordance with the difference between the signals of said first and second signal means, and means for providing a second damping signal input thereto in accordance with the rate of change of the difference between signals of said first and second signal means.

32. A system of the character claimed in claim 30, including means for damping the Schuler tuned system providing a damping signal input thereto in accordance with the rate of change of the difference between the signals of said first and second signal means.

33. A system of the character claimed in claim 30, including means providing a damping input signal to the Schuler tuned system that is effective with the signal of said signal reference means, and cut-off means for said damping means and reference signal means.

34. In a Schuler tuned gyroscopic system for dirigible craft, a gyro stabilized platform, means for producing a signal in accordance with the velocity of the platform, means for producing a signal in accordance with the velocity of the craft, and means providing an input to the platform to damp the system in accordance with the rate of change of the difference between the signals of said platform and craft velocity signal means.

35. A system of the character claimed in claim 34, including means providing a second input to the platform to damp the system in accordance with the difference between the signals of said platform and craft velocity signal means.

References Cited in the file of this patent

UNITED STATES PATENTS

| | | |
|---|---|---|
| 1,480,637 | Schuler | Jan. 15, 1924 |
| 2,414,291 | Evans | Jan. 14, 1947 |
| 2,501,885 | Barnes | Mar. 28, 1950 |
| 2,511,485 | Strobel | June 13, 1950 |
| 2,591,697 | Hays | Apr. 8, 1952 |
| 2,598,672 | Braddon | June 3, 1952 |
| 2,608,867 | Kellogg | Sept. 3, 1952 |
| 2,638,492 | Schmitt | May 12, 1953 |
| 2,729,108 | Vacquier et al. | Jan. 3, 1956 |
| 2,734,278 | Hammond | Feb. 14, 1956 |
| 2,752,792 | Draper | July 3, 1956 |
| 2,752,793 | Draper et al. | July 3, 1956 |

OTHER REFERENCES

Publication: "Navigation" Magazine, vol. 2, No. 8, December 1950.